Figure 1:
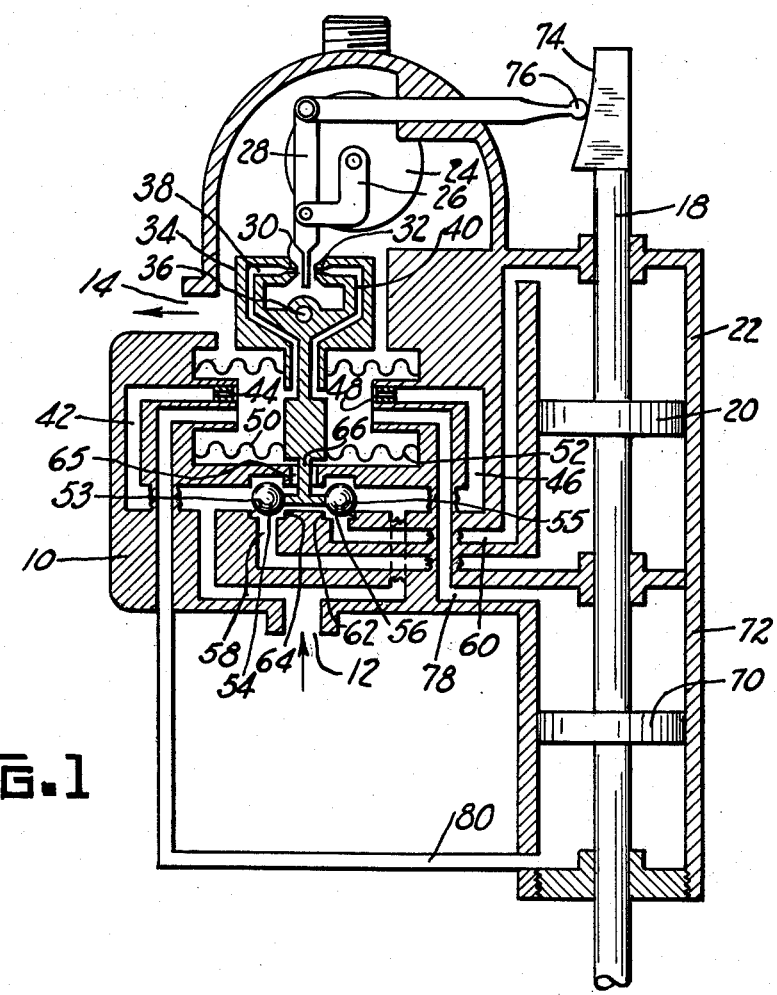

May 11, 1965 S. E. ARNETT 3,182,561
PNEUMATICALLY OPERATED SERVOMECHANISM
Filed Oct. 3, 1960 2 Sheets-Sheet 1

INVENTOR.
SAMUEL E ARNETT
BY
Robert C Smith
ATTORNEY

INVENTOR.
SAMUEL E. ARNETT

United States Patent Office 3,182,561
Patented May 11, 1965

3,182,561
PNEUMATICALLY OPERATED
SERVOMECHANISM
Samuel E. Arnett, South Bend, Ind., assignor to The Bendix Corporation, South Bend, Ind., a corporation of Delaware
Filed Oct. 3, 1960, Ser. No. 59,977
10 Claims. (Cl. 91—364)

This invention relates to servomechanisms and more particularly to a type of device having special utility where the most practicable power source available is a flow of hot gases either from a combustion chamber or from the decomposition of a monopropellant.

In certain missile and rocket systems it is desired to provide control means for movable nozzles, control surfaces, etc., where substantial amounts of power must be made available and where it is preferable that the most convenient source of power, e.g., combustion gases or the products of decomposition of a monopropellant, be used to power the control means. As in all aircraft equipment there is a significant advantage in reducing size and weight to a minimum. Where guidance is effected through radio signals or other very low level signals it will be recognized that a substantial power amplification must occur in order to produce power at the level ultimately required. While electrical signals may be amplified, the size and weight of equipment for delivering large amounts of power is such as to make it desirable to convert from electrical to pneumatic or hydraulic control at a very low power level. In some cases pneumatic input signals may be used. These also will have a low power level and so means must be provided for amplifying these signals manyfold.

Some application contemplate the use of monopropellants such as hydrogen peroxide either as primary power generating fuels or as fuels for auxiliary power equipment. In such applications, the auxiliary power units can be supplied with the hot gases resulting from decomposition of a monopropellant, as required by the system because means are normally provided for controlling the flow of such liquid monopropellant to the gas generating chamber. A substantial consumption of monopropellant by the control system therefore occurs only when there is a demand for power.

During the course of designing servo controls to be operated by the gaseous products of decomposition of a monopropellant or by product of combustion of a rocket engine, it became apparent that great difficulties were presented in trying to make such a control operate satisfactorily where internal temperatures were such that the entire unit became and remained red hot for extended periods of time. Valve seats, particularly, were eroded and so it was felt desirable to modify the structure shown in the copending application of H. L. McCombs et al., S. N. 782,732, now Patent No. 3,040,715, to improve the useful life and accuracy of the control valve structure. It is therefore an object of the present invention to provide a servomechanism capable of being operated by gases at very high temperatures for considerable periods of time without excessive deterioration of the control valve seats and other elements.

It is another object of the present invention to provide a servomechanism which accomplishes the above object and which can control large amounts of power without undue size and weight.

It is another object of the present invention to provide a servomechanism useful with a source of high energy compressible fluid which may be successfully throttled such that substantial amounts of such fluids will be expended only when substantial power output is required.

Figure 2:
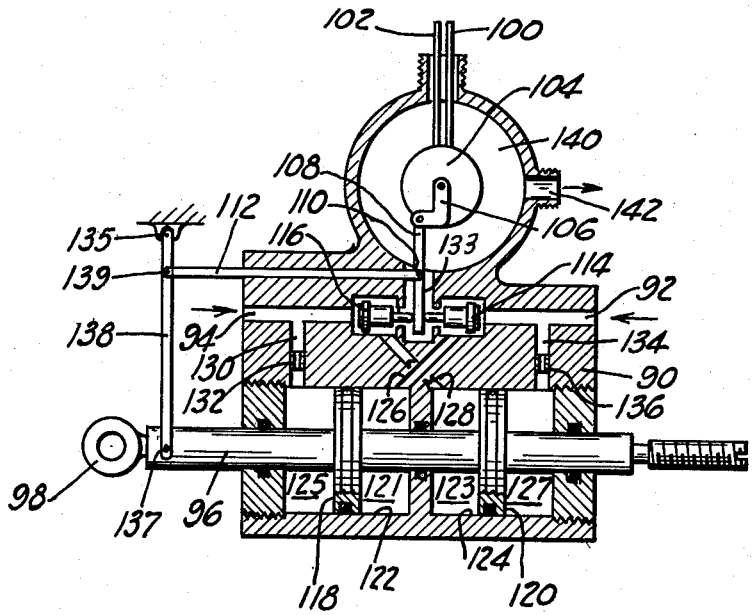

It is a further object of the present invention to provide a servomechanism which accomplishes the above objects and which incorporates novel feedback structure for damping to insure stable and accurate operation. Other objects and advantages will become apparent from the following specification taken in connection with the accompanying drawings in which:

FIGURE 1 is a cross-sectional view of a two-stage servomechanism embodying my invention; and
FIGURE 2 is a cross-sectional view of a very compact single stage servomechanism embodying my invention and incorporating valve mechanism having some advantages over than shown in FIGURE 1.

Referring now to FIGURE 1, the servomechanism is enclosed in a housing 10 having a connection 12 with a source of high energy compressible fluid which may be the gaseous products of combustion from a rocket motor. A conduit 14 carries exhaust gas from a housing 10. The output of the servomechanism is an axial movement of a shaft 18 driven by a piston 20 in a cylinder 22. The input signals to the servomechanism 10 are delivered to a torque motor unit 24 having an arm 26 attached to a flapper valve member 28. Flapper valve member 28 is positioned between a pair of orifices 30 and 32 forming part of a member 34 which is pivotable around a stationary supporting member 36. A pair of conduits 38 and 40 communicate inlet conduit 12 with the orifices 30 and 32 through a conduit 42 and bleed 44 and a conduit 46 and bleed 48, respectively. A bellows member 50 provides communication between conduits 38 and 42 and a similar member 52 provides communication between conduits 46 and 40. Conduits 42 and 46 also communicate with a pair of orifices 53 and 55 controlled by ball valves 54 and 56 which provide a restriction between said conduits and a pair of conduits 58 and 60 communicating with opposite sides of piston 20 in chamber 22. Also positioned downstream of ball valves 54 and 56 are a pair of orifices 62 and 64 both of which communicate with the exhaust conduit 14 through a passage 65 communicating with the chambers containing bellows 52 and 56. An arm 66 forming part of member 34 is movable therewith to control the position of ball valves 54 and 56 to either decrease flow through orifice 53 and increase flow through orifice 55 or vice versa. This causes a pressure differential to occur on the opposite sides of piston 20, thereby causing said piston 20 and shaft 18 to be moved axially.

Also attached to shaft 18 is a piston 70 in a cylinder 72. Formed on the end of shaft 18 is a cam surface 74, and riding on this cam surface is a follower member 76 which is connected to the flapper member 28, thereby providing position feedback to the flapper 28. A conduit 78 provides communication between the chamber on the upper side of piston 70 and the interior of bellows 52 and a conduit 80 communicates the chamber on the lower side of piston 70 with the interior of bellows 50. With this arrangement damping is provided which will be apparent from the discussion of the operation of the unit 10 as set forth below.

In discussing the operation of the device of FIGURE 1 it will be assumed that the system is supplied with power from a source of high energy compressible fluid such as the high temperature products of combustion of a rocket engine and that control signals are supplied to the torque motor 24 from an external amplification source. The flapper member 28 could also be operated through pneumatic means. In the absence of any signal, the flow will proceed from its source to the inlet conduit 12 thence into conduits 42 and 46 where part of it flows through the bleeds 44 and 48 into conduits 38 and 40 to orifices 30 and 32 where it impinges upon the flapper member 28 and is exhausted to the atmosphere. Part of the flow continues past the valves 54 and 56 into conduits 58 and 60 leading to the opposite sides of piston 20. In the absence of a control signal to the torque motor 24, flapper valve 28 will normally be held centered in the position shown, and the pressure of lines 38 and 40 will be the same and hence the pressure inside of each of bellows members 50 and 52 will be the same. There will therefore be no rotation of the member 34 around its pivot point 36, hence no movement of second stage arm member 66 and hence no pressure differential across piston 20.

Assume now that a signal is supplied to the torque motor which causes the arm 26 to rotate in a direction to move flapper valve 28 against the orifice 32 and away from the orifice 30. This will result in a pressure increase in line 40 and in the interior of bellows member 52 and a pressure decrease in line 38 and the interior of bellows 50. This will cause the pivotal member 34 to rotate around point 36 thereby moving the second stage ball valve member 56 against the orifice 62 and ball valve member 54 against orifice 53. This causes an increase in pressure in conduit 60 and an increase in pressure on the upper side of piston 20. There will also be a reduction in pressure in the conduit 58 and in the chamber in the lower side of piston 20 thereby causing said piston to be moved in a downward direction. As the piston 20 moves downward it carries shaft 18, the piston 70 and the cam surface 74 which presents a contour of decreasing rise to the cam follower member 76. The movement of piston 70 in a downward direction results in an increased pressure acting in bellows 50 and a decreased pressure in bellows 52 thus tending to oppose the change in pressure caused in these bellows when the flapper 28 was initially moved toward orifice 32. The cam surface 74 and follower 76 which act on flapper 28 constitute a position feedback mechanism which tends to cause the flapper valve 28 to be moved toward its null position as the shaft 18 is moved in either direction.

A signal supplied to the torque motor tending to move the flapper valve 28 against the orifice 30 will lead to an analogous result, member 34 being rotated in such manner as to cause ball valve 56 to be moved against its right orifice 55 and ball valve 54 to seat against orifice 64, a pressure increase occurs in the chamber on the lower side of piston 20 which moves shaft 18 and piston 70 upwardly. The contour of the cam surface 74 is such that the follower member 76 is caused to move toward the left thereby pulling the flapper valve member 28 again toward its null position. The pressure change in the chamber below piston 70 will be such that the pressure is increased in bellows 52 and reduced in bellows 50 thus tending to rotate member 34 back toward its null position.

It is also possible that there will be, in the absence of a control signal from the torque motor 24, a change in the forces acting on shaft 18 which will tend to cause said shaft to be moved in one direction or the other. This movement is not desired, of course, and the system will immediately correct for such movement through the feedback system as described. Under such conditions, the flapper valve member 28 would be centered when the shaft 18 was moved, for example, in an upward direction. This upward movement will result in the follower member 76 being moved toward the left thereby pulling the flapper valve member 28 closer to the orifice 32 and at the same time the upward movement of damping piston 70 causes an increase in the pressure in bellows 52, causing the member 34 to rotate in a direction to move ball valve 54 toward orifice 53 and causing an increase in the pressure on the top side of piston 20 which will oppose the force tending to move the piston 20 and the shaft 18 upwardly.

The device shown in FIGURE 2 is a single stage pneumatic servomechanism having a special utility where the level of amplification required is less than that required to operate the device shown in FIGURE 1. This unit consists of a housing 90 having a pair of inlet ports 92 and 94 for receiving a hot compressible operating fluid such as the gaseous products of combustion of a rocket engine. It is the purpose of this device to control the axial position of a shaft 96 which may be connected as by means of an eye-bolt 98 or similar mechanism with a control surface, movable nozzle, or other control element. The input to this device may be an electrical control signal coming from an external amplification source supplied to a pair of wires 100 and 102 which are connected to a torque motor 104. Torque motor 104 includes an output control arm 106 connected to a lever 108 which is pivoted at a point 110 on one end of a shaft 112. Positioned to be moved through movement of the lever 108 are control valve elements 114 and 116 which communicate with passages 92 and 94 respectively. Carried on the output shaft 96 are a pair of pistons 118 and 120 which are reciprocable in cylinders 122 and 124 respectively. A conduit 126 provides communication between valve member 114 and a chamber 121 on the right side of piston 118 and a conduit 128 provides communication between valve member 116 and a chamber 123 on the left side of piston 120. A passage 130 containing a bleed 132 provides communication between a chamber 125 on the left side of piston 118 and the inlet passage 94; and a passage 134 containing a bleed 136 provides communication between a chamber 127 on the right side of piston 120 and the inlet conduit 92. A lever 138 affixed to a stationary pin at 135 attached to the output shaft 96 at pivot point 137 is also attached to the feedback shaft 112 at pivot 139 to provide position feedback for the system. The control lever 108 is positioned in a channel 133 which communicates with a chamber 140 containing the torque motor 104. An exhaust port 142 communicates with chamber 140 and provides a means for exhausting the working fluid to the atmosphere or other low pressure source.

In discussing the operation of the FIGURE 2 device it must first be recognized that the working fluid is continuously supplied to both of conduits 92 and 94 at the same pressure. If there is no signal on the torque motor 104 and the lever 108 is therefore maintained in a neutral position, the valve members 114 and 116 will be approximately in the position shown and the high temperature, high pressure working fluid will flow past valve 114 into conduit 126 and into chamber 121. At the same time it also flows past valve member 116 through conduit 128 into chamber 123. Inasmuch as there is no effective difference in the restrictions from the inlet source, these pressures are identical and no movement of the output shaft 96 will result. There will, of course, be exhaust flow past valve members 114 and 116 into channel 133, chamber 140 and out of the exhaust passage 142. Now assume a signal to torque motor 104 tending to rotate arm 106 in a clockwise direction. This will cause the lever 108 to be rotated in a counterclockwise direction around the pivot point 110 and the valve member 114 will seat against the end of pasage 92 thus blocking flow between passages 92 and 126; at the same time the high pressure flowing into passage 94 will force the valve member 116 to the right and high pressure inlet fluid is then permitted to flow through channel 128 into chamber 123 on the left side of piston 120. When the valve member 114 is moved against its seat it restricts the flow of the working fluid into conduit 126 and the pressure in the chamber 121 is then permitted to be exhausted through conduit 126, channel 133, chamber 140 and the exhaust port 142. The differential in pressure across these pistons then causes the shaft 96 to be moved to the right. As piston 120 is moved toward the right it compresses the working fluid in the chamber 127 which can escape from this chamber only at a rate controlled by the effective area of bleed 136. Similarly, as piston 118 moves toward the right it causes a reduction in the pressure in chamber 125 below the level of the pressure supplied to inlet conduit 94 and this pressure can only regain its initial value at a rate permitted by the effective area of bleed 132. It will therefore be seen that the outside chambers act as damping means to prevent shaft 96 from overshooting its desired axial position. Should the signal supplied to torque motor 104 be such as to rotate arm 106 counterclockwise, the lever 108 will be moved in a position to cause valve 116 to be moved against its seat and the flow of fluid into the control chambers against the pistons 118 and 120 is opposite to that previously described and the shaft 96 will move toward the left. In either case movement of the shaft 96 causes the feedback shaft 112 to carry the pivot point 110 in the same direction thus causing the lever 108 to be moved toward a null position.

The system of FIGURE 2 has rather specific advantages for use with hot gas servomechanisms. While it was found that the ball valves shown in the FIGURE 1 configuration had considerable advantages over the poppet valves or the secondary flapper valve used in the application of H. L. McCombs et al., supra, the use of these ball valves involve certain complications of manufacture in that the concentric alignment of the seats and the spacing of the seats on each end of the travel of the arm 66 must necessarily be within very close tolerances. That is, when ball valve member 54 is moved to seat against orifice 64 the ball valve member 56 must also seat against orifice 55. And when member 66 is moved in the opposite direction the ball valve 56 should seat against orifice 62 at the same time that ball valve 54 makes contact with orifice 53. In the device of FIGURE 2, no such problem is present. When the valve member 114 is moved against the end of conduit 92 it simply becomes a matter of abutting two flat faces together and valve member 116 does not have to seat against a correponding orifice. Yet, because these are not poppet valves of the type which are required to seal tightly, but, rather, are designed to permit some flow at all times, the problem of erosion of valve seat and faces commonly experienced with such valves is not present. Also it has been found that the arrangement of the dumping means as through the use of the outside chambers as shown in FIGURE 2 provides a very compact and workable unit.

While only two embodiments have been shown and described herein; it will be understood that modifications may be made without departing from the spirit and scope of the invention.

I claim:

1. A two-stage servomechanism including a housing, an actuating shaft, a cylinder and a piston movable in said cylinder and outwardly connected to said actuating shaft, a source of high pressure fluid, a pair of conduits communicating said source with said cylinder on opposite sides of said piston, an outlet conduit for carrying exhaust flow from said housing, a member adapted for pivotal movement around a stationary point in said housing, first and second means defining oppositely disposed fluid chambers operatively connected to said movable member and communicating with said high fluid pressure source, first and second oppositely disposed orifice in said member and communicating with said first and second means, respectively, for controlling the fluid pressure therein, said member being actuated in response to the differential in pressures between said first and second means, a flapper valve movable between said orifices, electro-responsive means for positioning said flapper valve, a generally cylindrical chamber in each of said pair of conduits, part of the end walls of which form annular valve seats, a pair of generally spherical valve members adapted to co-act with said valve seats connected to said pivotally movable member for controlling the flow through said pair of conduits to vary the pressure level acting on opposite sides of said piston, a cam surface formed on said shaft, and means including a cam follower member for transmitting a position feedback signal varying with the position of said shaft to said flapper valve to cause said flapper valve to seek a null position.

2. A two-stage servomechanism including a housing, an actuating shaft, a cylinder and a piston movable in said cylinder and operably connected to said actuating shaft, a source of high pressure fluid, a pair of conduits communicating said source with said cylinder on opposite sides of said piston, an outlet conduit for carrying exhaust flow from said housing, a member adapted for pivotal movement around a stationary point in said housing, first and second means defining oppositely disposed fluid chambers operatively connected to said movable member and communicating with said high fluid pressure source, first and second oppositely disposed orifices in said member and communicating with said first and second means, respectively, for controlling the fluid pressures therein, said member being actuated in response to the differential in pressures between said first and second means, a flapper valve movable between said orifices, electro-responsive means for positioning said flapper valve, a pair of spherical valve members connected to and responsive to the pivotal movement of said member for controlling the flow through said pair of conduits to vary the pressure level acting on opposite sides of said piston, a cam surface formed on said shaft, and means including a cam follower member for transmitting a position feedback signal varying with the position of said shaft to said flapper valve to cause said flapper valve to seek a null position.

3. A two-stage servomechanism including a housing, an inlet conduit for carrying fluid under pressure to said housing, an outlet conduit for carrying exhaust flow from said housing, a cylinder in said housing and a piston movable in said cylinder, a shaft connected to said piston and movable therewith, a pair of passages communicating said inlet conduit with opposite sides of said piston, a movable member in said housing and a pair of opposing orifices formed in said member communicating with said inlet conduit, a valve member movable between said orifices for controlling the flow area thereof and thus the fluid pressures upstream therefrom and control means for positioning said valve member, a generally cylindrical chamber in each of said pair of passages, part of the end walls of which form annular valve seats, a pair of generally spherical valve members adapted to co-act with said valve seats and means movable in response to changes in pressure upstream of said opposing orifices operatively connected to said movable member for controlling said spherical valve members to vary the flow through said pair of passages to vary the pressure level acting on opposite sides of said piston.

4. A two-stage servomechanism including a housing, an inlet conduit for carrying fluid under pressure to said housing, an outlet conduit for carrying exhaust flow from said housing, movable wall means in said housing and force transmitting means operably connected to said movable wall means, a pair of passages communicating said inlet conduit with opposite sides of said movable wall means, first and second oppositely disposed fluid chambers communicating with said inlet conduit, a movable member separating said pair of chambers and responsive to the fluid pressures therein, first and second opposing orifices formed in said member and communicating with said first and second chambers, respectively, for controlling the fluid pressures therein, a valve member movable between said orifices for controlling the flow area thereof and thus the fluid pressures upstream therefrom in said first and second chambers and control means for positioning said valve, said movable member being movable in response to the differential in the pressure upstream of said opposing orifices, and means including a pair of substantial spherical valve members responsive to the movement of said member for varying the flow through said pair of passages to vary the pressure level acting on opposite sides of said movable wall means.

5. A servomechanism as set forth in claim 4 wherein positional feedback means are provided comprising a cam surface movable with said force transmitting means, and means including a cam follower member for transmitting a position feedback signal to said valve member.

6. A servomechanism as set forth in claim 4 wherein rate feedback means are provided including a second movable wall means movable with said force transmitting means, a chamber on each side of said second movable wall means, passage means connecting one of said last named chambers with said first chamber and the other of said last named chambers with said second chamber, said movable member being responsive to pressure variations in said first and second chambers caused by movement of said second movable wall means.

7. A servomechanism operable with a source of gas having high temperatures comprising a housing, a pair of inlet conduits connected to said source, an outlet conduit for carrying exhaust flow from said housing, a first cylinder in said housing and a piston movable in said cylinder, a second cylinder and a piston movable therein, an output shaft connected to both of said pistons, a pair of passageways communicating one of said inlet conduits with a first chamber on one side of one of said pistons and the other of said inlet conduits with a second chamber on the opposite side of one of said pistons, a pair of valve members for controlling the flow through said passageways, a torque motor, means movable in response to movement of said torque motor for positioning said valve members, third and fourth passageways connecting the remaining chambers adjacent said pistons with said inlet conduits, a restriction in each of said third and fourth passageways, and means operatively connected to said output shaft and to said means movable by the torque motor for providing position feedback to said last named means.

8. A servomechanism operable with a source of gas having high temperatures comprising a housing, a pair of inlet conduits connected to said source, an outlet conduit for carrying exhaust flow from said housing a first cylinder in said housing and a piston movable in said cylinder, a second cylinder and a piston movable therein, an output shaft connected to both of said pistons, a pair of passageways communicating one of said inlet conduits with a first chamber on one side of one of said pistons and the other of said inlet conduits with a second chamber on the opposite side of one of said pistons, a pair of valve members for controlling the flow through said passageways, control means for positioning said valve members, third and fourth passageways connecting the remaining chambers adjacent said pistons with said inlet conduits, a restriction in each of said third and fourth passageways, and means operatively connected to said output shaft and to said control means for providing position feedback to said control means.

9. A servomechanism operable with a source of gas having high temperature comprising a housing, a pair of inlet conduits connected to said source, an outlet conduit for carrying exhaust flow from said housing, a first cylinder in said housing and a piston movable in said cylinder, a second cylinder and a piston movable therein, an output shaft connected to both of said pistons, a pair of passageways connecting one of said inlet conduits with a chamber on one side of the pistons in said first cylinder and the other of said conduits with a chamber on the opposite side of the piston in said second cylinder, a cylindrical chamber in each of said passageways part of the end wall which forms a flat annular valve seat, a conduit providing communication between each of said chambers and said outlet conduit, a generally cylindrical valve member in each of said chambers adapted to co-act with said valve seat, a torque motor, a lever attached to said torque motor and to said valve members for positioning said valve member in response to movement of said torque motor, a second pair of passageways connecting the remaining chambers adjacent said pistons with said inlet conduits, a restriction in each of said second pair of passageways, and means operatively connected to said output shaft and to said lever for moving said lever in a direction toward null in response to the movement of said output shaft.

10. A servomechanism operable with a source of gas having high temperatures comprising a housing, a pair of inlet conduits connected to said source, an outlet conduit for carrying exhaust flow from said housing, a first cylinder in said housing and a piston movable in said cylinder, a second cylinder and a piston movable therein, an output shaft connected to both of said pistons, a pair of passageways communicating one of said inlet conduits with a chamber on one side of the piston in said first cylinder and the other of said conduits with a chamber on the opposite side of the piston in said second cylinder, a cylindrical chamber in each of said passageways part of the end wall of which forms a flat annular valve seat, a conduit providing communiaction between each of said chambers and said outlet conduit, a generally cylindrical valve member in each of said chambers adapted to co-act with said valve seat, an input signal source, means attached to said input signal source and to said valve members for positioning said valve members in response to changes of said input signal source, a second pair of passageways connecting the remaining chambers adjacent said pistons with said inlet conduits, a restriction in each of said second passageways, and means operatively connected to said output shaft and to said valve member positioning means for moving said means in a direction toward null in response to the movement of said output shaft.

References Cited by the Examiner

UNITED STATES PATENTS

| 1,638,102 | 8/27 | Roncka | 121—41 |
| 2,548,481 | 4/51 | Knowler et al. | 121—41 |
| 2,610,614 | 9/52 | Sedgwick | 121—41 |
| 2,814,487 | 11/57 | Medkeff | 121—41 |
| 2,947,286 | 8/60 | Baltus et al. | 121—157 |

FRED E. ENGELTHALER, *Primary Examiner.*

KARL J. ALBRECHT, RALPH H. BRAUNER,
*Examiners.*